United States Patent
Starr

(10) Patent No.: US 9,218,133 B2
(45) Date of Patent: Dec. 22, 2015

(54) DATA DEDUPLICATION IN A REMOVABLE STORAGE DEVICE

(75) Inventor: Matthew Thomas Starr, Lafayette, CO (US)

(73) Assignee: Spectra Logic, Corp, Boulder, CO (US)

( * ) Notice: Subject to any disclaimer, the term of this patent is extended or adjusted under 35 U.S.C. 154(b) by 234 days.

(21) Appl. No.: 13/588,075

(22) Filed: Aug. 17, 2012

(65) Prior Publication Data

US 2014/0052907 A1 Feb. 20, 2014

(51) Int. Cl.
  *G06F 12/00* (2006.01)
  *G06F 3/06* (2006.01)

(52) U.S. Cl.
  CPC .......... *G06F 3/0613* (2013.01); *G06F 3/0641* (2013.01); *G06F 3/0686* (2013.01)

(58) Field of Classification Search
  CPC .... G06F 3/0613; G06F 3/0641; G06F 3/0686
  USPC ........................................................ 711/111
  See application file for complete search history.

(56) References Cited

U.S. PATENT DOCUMENTS

| | | | |
|---|---|---|---|
| 6,795,874 B2 | 9/2004 | Martin et al. | |
| 7,304,646 B2 | 12/2007 | Iwata | |
| 8,560,507 B2 * | 10/2013 | McNutt | 707/692 |
| 2004/0024807 A1 | 2/2004 | Cabrera et al. | |
| 2004/0261050 A1 | 12/2004 | Broberg, III et al. | |
| 2008/0186052 A1 | 8/2008 | Needham et al. | |
| 2010/0100649 A1 | 4/2010 | Madukkarumukumana et al. | |
| 2010/0153590 A1 | 6/2010 | Hsin et al. | |
| 2010/0325480 A1 | 12/2010 | Ghanem et al. | |
| 2011/0161543 A1 | 6/2011 | Van Holder et al. | |
| 2012/0030382 A1 | 2/2012 | Kim | |
| 2012/0072523 A1 | 3/2012 | Michels et al. | |
| 2012/0110232 A1 | 5/2012 | Amitay et al. | |

* cited by examiner

*Primary Examiner* — Matthew Bradley
(74) *Attorney, Agent, or Firm* — Kenneth Altshuler

(57) ABSTRACT

An apparatus and associated methodology contemplate a data storage system having a removable storage device operably transferring data between the data storage system and another device via execution of a plurality of input/output (I/O) commands. A commonality factoring (CF) module executing computer instructions stored in memory assigns a CF tag to a data pattern in the transferred data. A deduplication module executing computer instructions stored in memory determines if the data pattern corresponding to the CF tag is previously stored in the removable storage device.

14 Claims, 13 Drawing Sheets

DATA DEDUPLICATION IN A REMOVABLE STORAGE DEVICE

CROSS-REFERENCE TO RELATED APPLICATIONS

None.

BACKGROUND OF THE INVENTION

1. Field of the Invention

The present embodiments relate generally to a storage element array suited for use in a distributed storage system and more particularly but without limitation to data deduplication in a removable storage device.

2. Description of Related Art

The combination of multiple storage devices into distributed data storage capacity has proliferated in response to market demands for storing enormous amounts of data that can be readily retrieved in a fast, reliable, and efficient manner.

With continued demands for ever increased levels of storage capacity and data transfer throughput performance, there remains an ongoing need for improvements in the manner in which the storage elements in such data storage arrays are operationally managed in order to optimize the capacity and data throughput performance parameters while minimizing storage expense. It is to these and other related improvements that preferred embodiments of the present invention are generally directed.

SUMMARY OF THE INVENTION

Some embodiments of the present invention contemplate a data storage system having a removable storage device operably transferring data between the data storage system and another device via execution of a plurality of input/output (I/O) commands. A commonality factoring (CF) module executing computer instructions stored in memory assigns a CF tag to a data pattern in the transferred data. A deduplication module executing computer instructions stored in memory determines if the data pattern corresponding to the CF tag is previously stored in the removable storage device.

Some embodiments of the present invention contemplate a method that includes: obtaining a data storage system having a removable storage device that is partitioned into an addressable library partition and a differently addressable user data partition; transferring data between the data storage system and another device via execution of a plurality of input/output (I/O) commands; performing commonality factoring (CF) to assign a CF tag to a data pattern in the transferred data; and deduplicating data by determining whether the data pattern corresponding to the CF tag is previously stored in the removable storage device.

Some embodiments of the present invention contemplate a data storage library having a frame and a shelf system supported by the frame to queue a plurality of tape cartridges. A plurality of tape drives is each adapted to engage one of the tape cartridges at a time in a data transfer relationship. A transport system selectively moves the tape cartridges between the queue in the shelf and the data transfer relationships in one of the plurality of tape drives. A controller selectively accesses stored instructions that when executed assign a commonality factoring (CF) tag to a data pattern in the transferred data and deduplicate stored data by determining if the CF tag is previously stored in the removable storage device.

DETAILED DESCRIPTION

Initially, it is to be appreciated that this disclosure is by way of example only, not by limitation. The data transfer concepts herein are not limited to use or application with any specific system or method for using storage element devices. Thus, although the instrumentalities described herein are for the convenience of explanation, shown and described with respect to exemplary embodiments, it will be appreciated that the principles herein may be applied equally in other types of storage element systems and methods involving the storage and retrieval of data.

Figure 1:
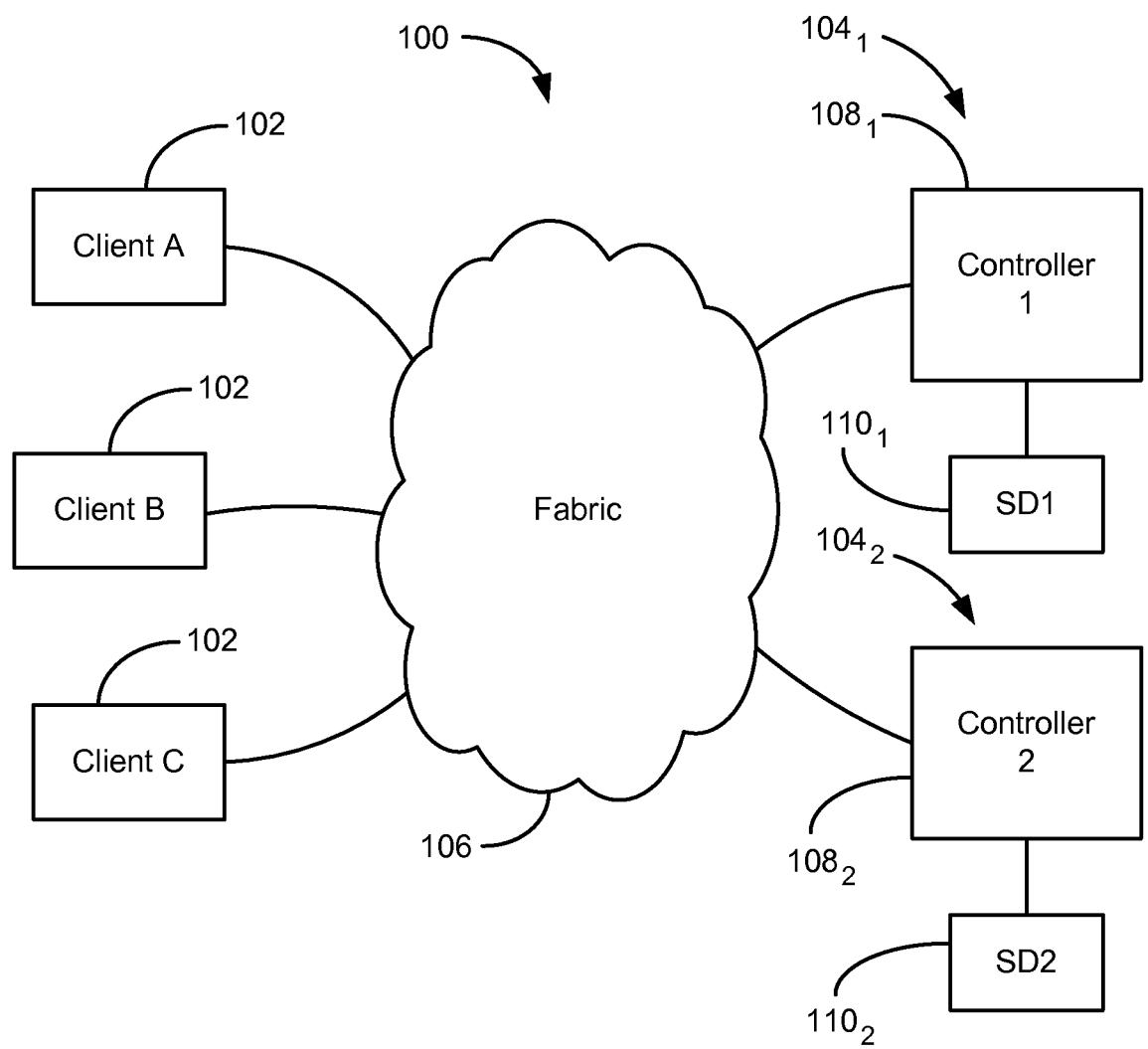
FIG. 1 is a functional block depiction of a distributed storage system utilizing a storage device array that is constructed in accordance with embodiments of the present invention.

To illustrate an exemplary environment in which preferred embodiments of the present invention can be advantageously practiced, FIG. 1 shows a data storage system 100 characterized as providing a storage area network (SAN) utilizing mass storage. The system 100 includes a number of processing client devices 102, respectively identified as clients A, B, and C. The clients 102 can interact with each other as well as with a pair of data storage arrays 104 via a fabric 106. The fabric 106 is preferably characterized as Ethernet, although other configurations can be utilized as well, including the Internet. Data is transferred between the clients 102 and the storage arrays 104 by executing input/output (I/O) commands. Generally, an I/O command can originate from either a client 102 or a storage array 104 to store data to or retrieve previously stored data from a storage array 104.

Each storage array 104 includes one or more controllers 108 and a set of data storage devices 110. It is further contemplated that in some embodiments the A client 102 and the data storage array $104_1$ can be physically located at a first site, the B client 102 and storage array $104_2$ can be physically located at a second site, and the C client 102 can be yet at a third site, although such is merely illustrative and not limiting.

Figure 2:
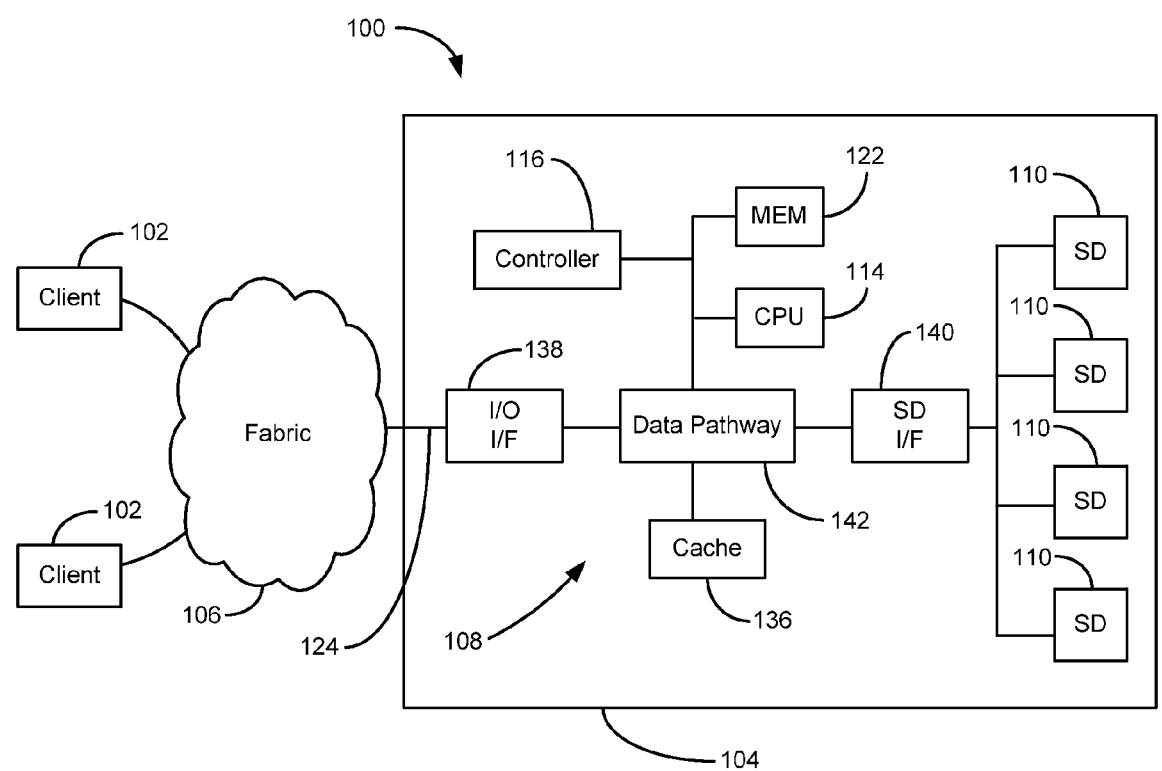
FIG. 2 is a functional block depiction of a portion of the storage device array of FIG. 1.

FIG. 2 diagrammatically depicts illustrative embodiments of the data storage system 100 in which one of the storage arrays 104 is connected to the clients 102 to transfer user data with a number of storage devices 110 that are individually selectable to transfer the user data by executing the I/O commands via the switchable fabric 106. The storage devices 110 can be, without limitation, removable media drives such as tape drives used for purposes of the detailed description below. For purposes of this description and meaning of the claimed subject matter the term "user data" means data that is transferred to the storage array 104 and that is retrieved from the storage array 104 as the result of a user of the data storage system 100 interfacing, either directly or indirectly, with one or more of the clients 102. For example, without limitation, the client 102 can be a computational device with a user interface permitting the user to either store information of quantitative or qualitative value (such as a document), or to retrieve such previously stored information. That is, when a user of a computer selects menu options "file," "save," and designates a "filename," the computer saves user data corresponding to the computer readable content (such as a document, spreadsheet, drawing, and the like) to a data storage device 110. It is noted that the computer system in handling file data also handles non-file object-oriented programming language structures such as inodes. During a transfer the file data is accompanied by the non-file data, sometimes referred to as metadata, that provides system information for properly routing and processing the user data in order to reliably store and retrieve it. The metadata informs the data storage system of pertinent details such as what type of data format is being transferred, the file name, redundancy identifiers, and the like.

In these illustrative embodiments each of the remote clients 102 can view the entire physical storage capacity (via the storage devices 110) of the storage array 104 as a unified storage space. The storage array 104, the client 102, or a network appliance (not shown) virtualizes the physical storage space to a logical addressing nomenclature. The storage array 104 also buffers data being transferred between the clients 102 and the storage devices 110 to optimize I/O throughput performance, such as by employing writeback commands that temporarily store user data and acknowledge the write as being complete before that transfer of user data is actually completed via the storage devices 110. The storage array 104 can also advantageously employ predetermined fault tolerance arrangements in which parallel, redundant links store at least some of the user data so that a redundant copy of the user data can be retrieved or reconstructed in the event that the primary copy of the user data becomes unavailable.

The circuitries represented by the functional block depiction in FIG. 2 and otherwise throughout this description generally can be embodied in a single integrated circuit or can be distributed among a number of discrete circuits as desired. In these illustrative embodiments, a main processor (CPU) 114, preferably characterized as a programmable computer processor, provides top-level control in accordance with programming steps and processing data stored in non-volatile memory (such as flash memory or similar) and in dynamic random access memory (DRAM). The CPU 114 can be any processing circuit capable of executing computer instructions, such as an embedded microprocessor, a microcontroller, a state-machine, a digital signal processor (DSP), and the like. Furthermore, the CPU 114 can have multiple core processing elements functioning simultaneously and independently of each other.

A controller 116 enhances the data throughput efficiency by reducing the occurrence of repeatedly storing the same data. For example, a data file or object that is already stored in memory might be updated to revise only a small portion of it. In that case data throughput capability can be improved by storing only the updated part of the data instead of the entire updated data because most of the entire updated data is already stored.

An I/O interface 138 provides signal conditioning and buffering for the CPU 114 and the controller 116 regarding signal transmissions with the network 106. The I/O interface 138 can include application specific drivers and logic to support communications via the network 106, such as PCI, Ethernet, inter-integrated circuit ($I^2C$), universal serial bus (USB), IEEE-1394 (FireWire), control area network bus (CAN), proprietary network or bus formats, and the like.

Figure 3:
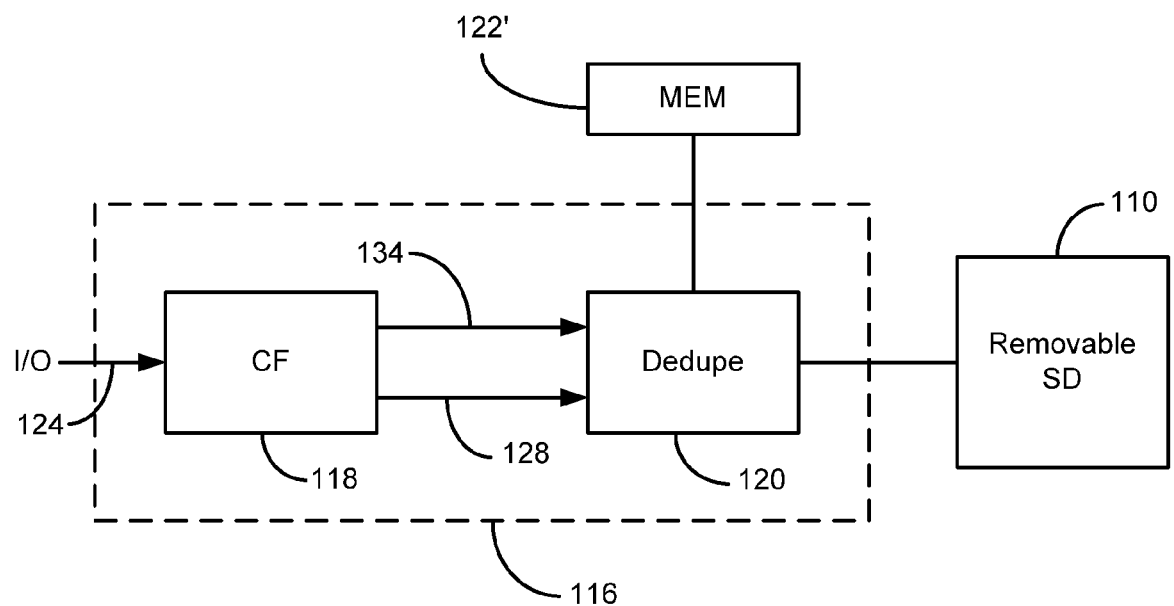
FIG. 3 is a functional block depiction of portions of the storage device array of FIG. 2.

FIG. 3 is a functional block depiction of the controller 116, which includes a commonality factoring ("CF") module 118, a deduplication (dedup) module 120, control of a low latency memory 122', and one of the storage devices 110, more particularly in these illustrative embodiments a removable storage device 110. In the illustrative embodiments below, for example, the removable storage device 110 is a tape cartridge data storage device.

Figure 4:
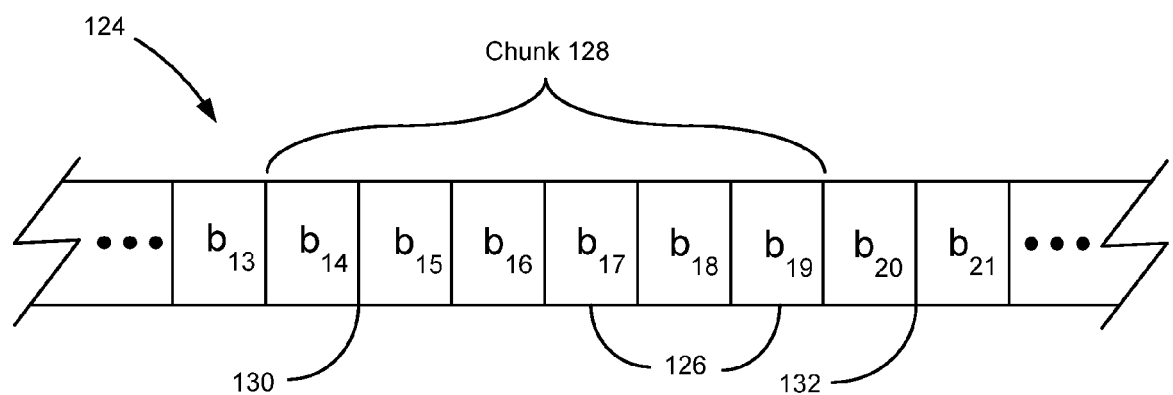
FIG. 4 diagrammatically depicts the I/O stream in the distributed storage system of FIG. 1.

The CF module 118 can be hardware and/or software executing computer programming instructions to segment the I/O stream 124 into manageable subportions for the purpose of reducing the occasions where a previously stored data pattern is redundantly stored again. For purposes of this illustrative description, FIG. 4 diagrammatically depicts a plurality of same-size data blocks 126 forming the I/O stream 124. The CF module 118 parses the I/O stream 124 into subgroups of the data blocks 126 which, for the purposes of this description, are referred to as chunks 128 of data. In this example the chunk 128 is formed of six data blocks $126_{b15-b20}$ between chunk boundaries 130, 132. The fact that the boundaries 130, 132 coincide with data block 126 boundaries is merely illustrative for purposes of this description, not limiting of the contemplated embodiments. In alternative equivalent embodiments the boundaries 130, 132 can divide a data block 126.

The chunks 128 can be derived either on a basis of a fixed number of data blocks 126 ("fixed-size") or on a basis of a variable number of data blocks 126 ("variable-size"). In the fixed-size basis the CF module 118 divides the I/O stream 124 into discrete chunks 128 on the basis of a predetermined size of data in each chunk 128—the number of data blocks 126. All computation, transfer, and storage metrics are thus optimized around the predetermined (constant) size of each chunk 128. However, the fixed-size basis is disadvantageously usually rendered ineffective by small amendments to comparably large data files/objects. That is, appending data to a previously stored data pattern (such as can occur with a file update) can cause an offset in the new data pattern in comparison to the previously stored data pattern, making the commonality of the two patterns indiscernible to the CF module 118. For example, consider this previously stored I/O stream as it was originally parsed by the CF module 118 on a fixed-size basis of four data blocks 126 per chunk 128. That yields three chunks 128, the first containing data blocks 126$_{1-4}$, the second containing data blocks 126$_{5-8}$, and the third containing data blocks 126$_{9-12}$:

| | | | |
|---|---|---|---|
| 1 2 3 4 | 5 6 7 8 | 9 10 11 12 | (first I/O stream) |

If, after storing that data, it is amended to add data pattern 13 at the head, then the fixed-size parsing by the CF module 118 becomes:

| | | | |
|---|---|---|---|
| 13 1 2 3 | 4 5 6 7 | 8 9 10 11 | (amended I/O stream) |

The disadvantageous result is that despite the fact that the majority of the data pattern sequence formed by these three chunks 128 (data patterns 1-11) is the same, the fixed-size sampling typically doesn't discern that data pattern sequence downstream of where new data is appended.

That disadvantage can be remedied by using the variable-size basis, which parses the I/O stream according to boundaries defined by the data content, not size. The boundaries are empirically derived by comparing a plurality of different distributions of the data taken in a sliding window of the I/O stream. For example, fingerprints or checksums can be generated within a predefined window of the I/O stream 124, wherein one or more newest bytes continually replace the like number of oldest bytes. Lookup tables can be employed to shorten complicated calculation algorithms generating the comparative snapshots. Applying the variable-size basis to the example above demonstrates its efficacy in discerning at least some redundancy in the previously stored data:

| | | | |
|---|---|---|---|
| 1 2 3 4 | 5 6 7 8 | 9 10 11 12 | (first I/O stream) |
| 13 1 2 3 4 | 5 6 7 8 | 9 10 11 12 | (amended I/O stream) |

Returning to FIG. 3, upon either parsing basis, ultimately the CF module 118 outputs a sequence of chunks 128 along with identification information generally referred to herein as a CF tag 134 uniquely identifying each chunk 128. In alternative embodiments mentioned above where the chunk 128 boundaries may or may not coincide with the data block 126 boundaries, the CF module 118 can also mark each chunk 128 with an end-of-file indicator (not depicted) for synchronizing the chunks 128 to the data blocks 126 in the processing described herein.

The CF tag 134 quantifies an identifier for each chunk 128 in terms of the sequence of the data bytes in the respective data blocks 126. For illustrative purposes of this description the CF tag 134 can be a cryptographic hash function, such as a message digest algorithm (MDA), or a secure hash algorithm (SHA), for example. However, the contemplated embodiments of the present invention are not limited in that in equivalent alternative embodiments the CF tag 134 can be other types of quantifiable identifiers, such as, but not limited to Rabin fingerprinting and the like.

The CF tag 134 summarizes the content of the data in the chunk 128, such as for example without limitation, by labeling the chunk 128 with a hash tag. Thus, for two chunks 128 having the same data content the deduplication module 120 will generate the same CF tag 134. Two CF tags 134 can be computationally compared significantly faster than a byte-by-byte comparison of the two corresponding sets of data in the chunks 128. Two or more CF tags 134 are compared (instead of comparing the data sets) in order to determine whether the I/O stream 124 includes a write command for a data pattern that has already been stored in the data storage system 100. The second write command can be eliminated for being unnecessarily redundant, instead writing a reference to the already existing data pattern where the redundant copy would have otherwise been written. The chance that two different data sets generate the same CF tag 134, called a data collision, is rendered an insignificant risk by selecting an appropriate commonality factoring algorithm.

The chunks 128 and corresponding CF tags 134 are received by the deduplication module 120, which determines whether the data pattern corresponding to each CF tag 134 is previously stored in the removable storage device 110.

Returning to FIG. 2, a memory, such as the cache 136, temporarily stores (buffers) unexecuted I/O commands and corresponding user data until such a time that they are executed to effect the transfer of the user data via the storage devices 110. A control memory 122 is employed to store system information and instructions, as well as caching functions in the illustrative embodiments herein. Examples of a control memory device 122 include, but are not limited to, solid state memory devices, magnetic disk drives, rotating memory devices, general random access memory devices, etc. Certain embodiments contemplate the control memory device 122 providing data recall (and data storage) at a significantly faster rate than that of the data storage devices 110. In these depicted embodiments the memory 122' in FIG. 3 is contemplated as being a partitioned storage space of the memory 122 in FIG. 2, although the contemplated embodiments are not so limited.

The I/O interface 138, a storage device interface 140, and data pathway logic 142 form a pass-through communication path for commands and data between the storage devices 110 and the client(s) 102. Again, although illustrated discretely, it will be understood that the pathway logic 142 and the corresponding I/F circuits 138, 140 can be unitarily constructed.

Figure 5:
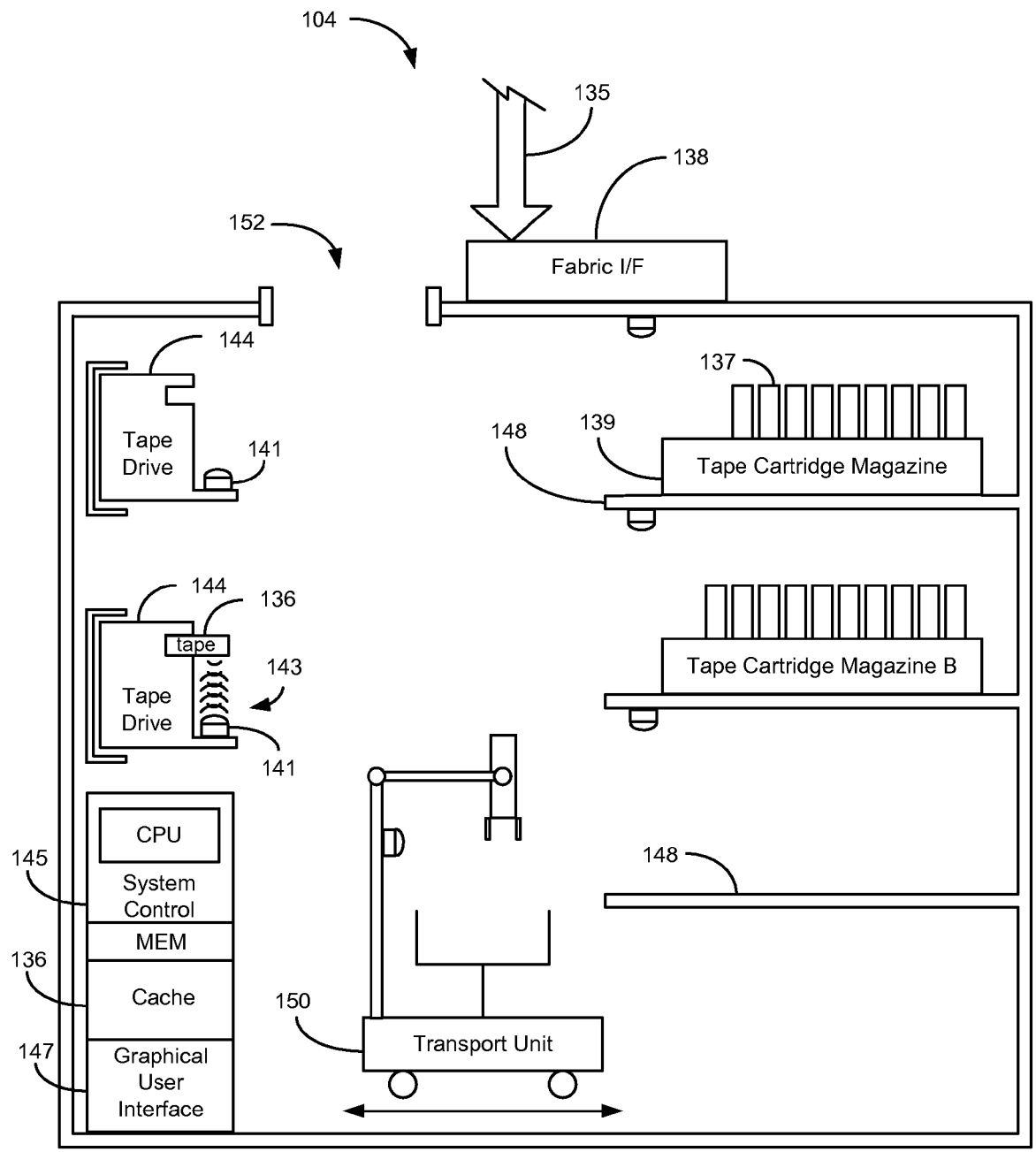
FIG. 5 is a diagrammatical depiction of the storage device array of FIG. 1 constructed in the form of a tape library in accordance with illustrative embodiments of the present invention.

FIG. 5 diagrammatically depicts the storage array 104 constructed as a tape library in accordance with illustrative embodiments of the present invention. External communications for the transfers of user data corresponding to the I/O commands are performed via the fabric interface 138 coupled to a communications link 135. The number and arrangement of the various components depicted in FIG. 5 are merely illustrative and in no way limiting of the claimed invention. The tape library has a plurality of tape cartridges 137 grouped in magazines 139. Each of the tape cartridges 137 is identifiable, such as by radio frequency identification (RFID) tags or semiconductor memory devices and the like, for selectively loading a desired one of the tape cartridges 137 into one of a plurality of tape drives 144. For purposes of this illustrative example the storage device 110 (such as 110 in FIG. 2) is constituted of one of the tape cartridges 137 operably mounted in one of the tape drives 144. The removable storage device 110 (such as in FIG. 3) more particularly refers to the fact that the mounted tape cartridge 137 is selectively removable from the tape drive 144. However, these described embodiments are merely illustrative and not limiting of the claimed embodiments. For example, without limitation, in equivalent alternative embodiments the removable storage device 110 can be other types of removable data storage devices, and in other equivalent alternative embodiments the storage devices 110 can contain nonremovable data storage media such as hard disc drives, solid state drives, optical drives, and the like.

In these illustrative embodiments, each of the tape cartridges 137 is selectively mounted into one of the tape drives 144 to cooperatively form an operable data transfer relationship to store data to and/or retrieve data from the tape cartridge 137. Each tape drive 144 can have a MAM device reader/writer 141 to store data to and/or retrieve data from the MAM device. In these illustrative embodiments the tape drive 144 establishes wireless communications 143 with the MAM device, such as by radio frequency communication, although neither the disclosed embodiments nor the claimed embodiments are so limited to those illustrative embodiments. The MAM device data can advantageously include access occurrence data, such as timestamp data indicating when the tape cartridge 137 is mounted to a tape drive 144, load count data indicating how long a tape cartridge 137 is mounted to the tape drive 144, validity data indicating any data and/or portions of the storage medium in a tape cartridge 137 of questionable integrity, and the like. Besides, or in addition to, storing data on the MAM devices, a system control 145 can include memory ("MEM") to accommodate information, such as the access occurrence data, load data, validity data, and the like, from each of a plurality of MAM devices associated with respective tape cartridges 137. Computational routines on the data stored in the MAM devices and in the system control memory can be under the top-level control of the system control 145. A graphical user interface ("GUI") 147 provides helpful tabular and graphical information to a user of the tape library for providing inputs thereto and receiving useful outputs therefrom.

The tape library can advantageously have a shelving system 148 capable of processor-based archiving the magazines 139 within the tape library. The magazines 139, and hence the tape cartridges 137 the magazines 139 contain, remain in a queue functional state while stored in the shelving system 148. The term "queue" for purposes of this description and meaning of the claims generally means a "wait functional state." A transport unit 150 shuttles magazines 139 between the shelving system 148 and the tape drives 144, and picks and places a particular tape cartridge 137 from a shuttled magazine 139 to/from a desired tape drive 144. The tape cartridges 137 are moved to a data transfer relationship functional state when mounted in the tape drives 144. Again, although FIG. 5 diagrammatically depicts two magazines 139 of eleven tape cartridges 137 each being shuttled to and from two tape drives 144, that arrangement is merely illustrative and in no way limiting of the claimed embodiments. In any event, a desired number of tape drives 144 can be provided within the tape library to concurrently access a corresponding number of tape cartridges 137 in a storage element array 104, or two or more tape libraries can communicate with each other to form that same or a similar storage element array 104.

The tape library is not necessarily limited to using a fixed number of tape cartridges 137. Rather, an access port 152 is configured to cooperate with an external transport system (not shown) to deliver or remove individual tape cartridges 137 or magazines 139.

Top-level control is provided by the system control 145 in communication with all the various components via a computer area network (not shown). Data, virtual mappings, executable computer instructions, operating systems, applications, and the like are stored to the system control 145 and accessed by one or more processors in and/or under the control of the system control 145. The system control 145 includes macroprocessors, microprocessors, memory, and the like to logically carry out software algorithms and instructions.

As one skilled in the art will recognize, the illustration of the tape library in FIG. 5 diagrammatically depicts only major elements of interest for purposes of simplicity. As such, certain necessary structures and components for the aforementioned elements to properly function are omitted from the detailed description, the enumeration of such not being necessary for the skilled artisan to readily ascertain the enablement of this description and the scope of the claimed subject matter. For example, it will be understood that the tape library includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 6:
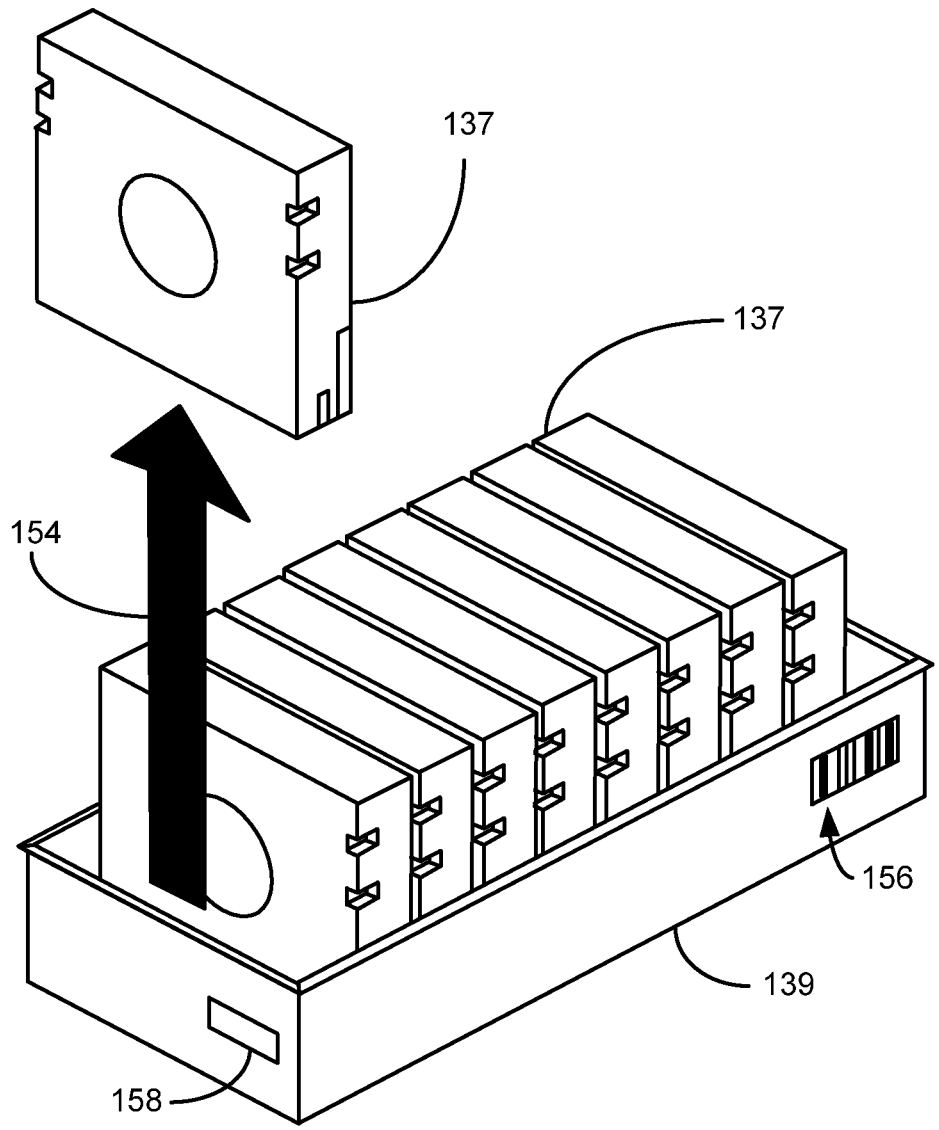
FIG. 6 is an isometric depiction of one of the magazines with tape cartridges in the tape library of FIG. 3.

FIG. 6 depicts the tape cartridges 137 supported for storage and transit by the magazine 139. In more detail, the tape cartridge 137, such as an LTO-5 or LTO-6 (generally "LTO") category tape cartridge manufactured by IBM, of Armonk, N.Y., employs magnetic tape that is capable of storing digital data written by the tape drive 144 (FIG. 5). The magazine 139 is depicted as being populated with a plurality of the tape cartridges 137, each of which can be removed upwardly by the transport unit 150 (FIG. 5), in the direction of arrow 154, then inserted into the tape drive 144. An indicia such as a bar code identification tag 156 is one way of identifying the magazine 139. Additionally, these embodiments depict a MAM device 158 attached to the magazine 139 and associated with one or more, preferably all, of the tape cartridges 137 residing in the magazine 139. Alternatively, the MAM device 158 can be attached to the tape cartridge 137. The MAM device 158 can be a passive device that is energized when subjected to a sufficiently strong radio frequency field generated by the MAM writer/reader device 141 (FIG. 5).

Figure 7:
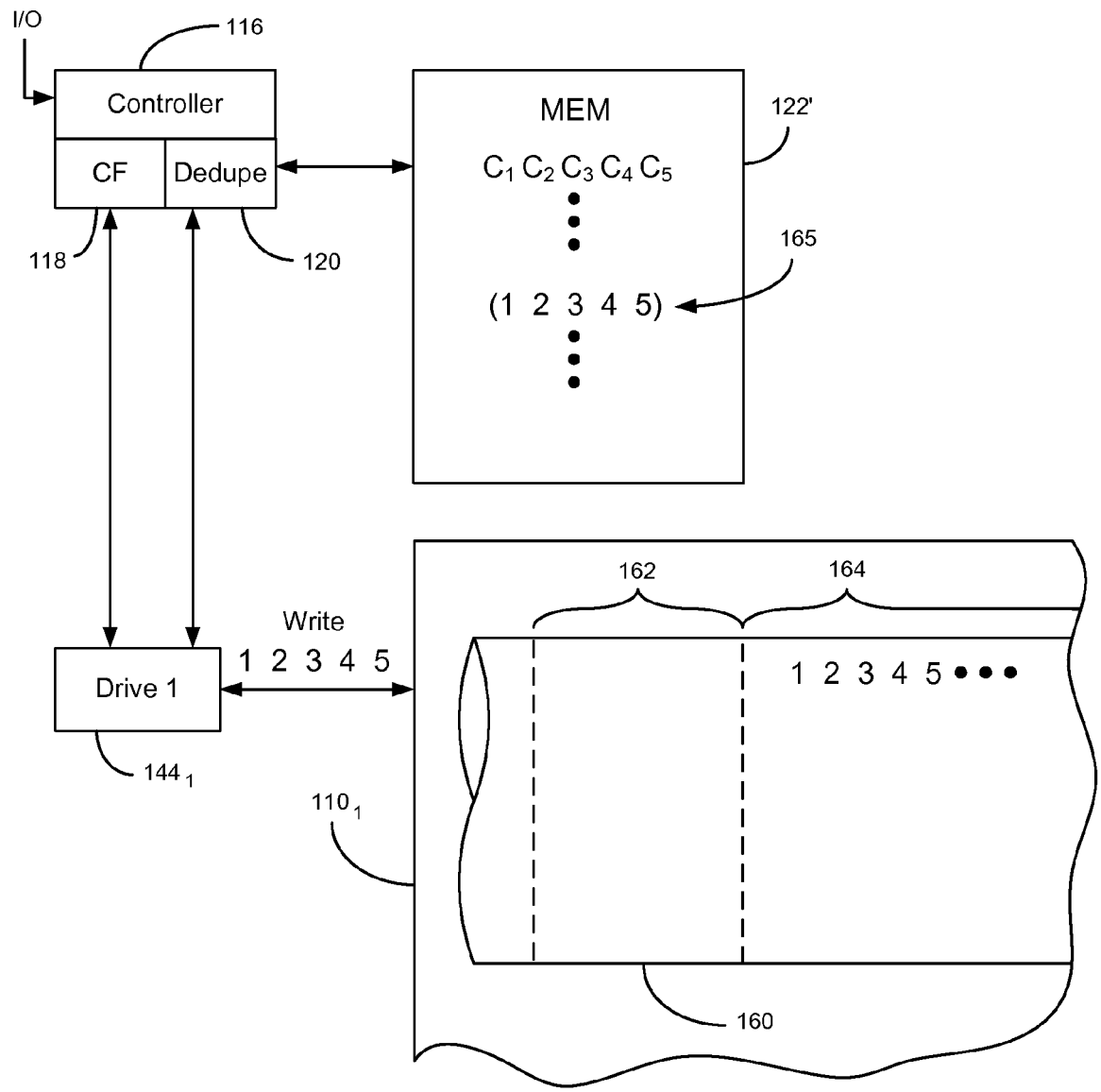
FIG. 7 diagrammatically depicts the controller directing a write request for chunks 1, 2, 3, 4, 5 to one of the tape cartridges of FIG. 5.

FIG. 7 diagrammatically depicts the controller 116 directing a write command to one of the tape cartridges $137_1$ via one of the tape drives $144_1$. The write data, for purposes of this illustrative example, is depicted as being five different chunks 128 of data patterns 1, 2, 3, 4, 5. The tape storage medium 160 in the tape cartridge $137_1$ is partitioned into two completely separate data storage partitions 162, 164. The partitions 162, 164 depict a lateral partition, meaning a partition that spans entirely across all storage tracks of the tape medium 160. Alternatively, although not depicted, a longitudinal partition can be provided by designating one or more tracks to one partition and different tracks to the other partition or partitions. In any event, each partition 162, 164 is identified and addressed separately from the existence of any other data or other partition(s) on the tape storage medium 160. Again, although the illustrative embodiments depicted by FIG. 7 generally describe multi-partitioning in terms of two partitions 162, 164, this is by way of example; accordingly, the claimed embodiments are not so limited in that the skilled artisan will appreciate that in equivalent alternative embodiments the same can be said for three or more partitions. Also, importantly, although the illustrative embodiments depicted by FIG. 7 describe both partitions 162, 164 existing on the tape storage medium 160, the claimed embodiments are not so limited in that the skilled artisan appreciates that in alternative equivalent embodiments, one or all of the partitions, preferably the library partition discussed below, can be formed in the corresponding electronic indicia device (such as MAM 158 in FIG. 6) either on the tape cartridge $137_1$ or on the magazine 139. Alternate embodiments further contemplate multiple partitions logically mapped across a tape storage medium, for example.

More particularly, these illustrative embodiments depict the tape storage medium 160 is formatted to include a library partition 162 and a user data partition 164. A corresponding label block (not shown) is typically written at the start of each respective partition 162, 164 to identify it as such. The library partition 162 contains information used by the controller 116 to deduplicate stored data in the user data partition 164. For purposes of this description and meaning of the appended claims, "user data" means a set of data collectively recognized and stored by the storage system, such as a computer-readable data file or an object-oriented programming language structure and the like, that is designated to the user data partition 164. Generally, I/O commands transfer user data between a client 102 and the storage array 104 in terms of a system recognizable (file or object) user data set. The term "designated to" can include both a user data set that is presently stored to the user partition 164 as well as a user data set that is directed to be stored to the user data partition 164 by way of a pending write command.

The library partition 162 is continually updated to include a complete set of unique chunk identifiers 134 for all the chunks 128 of data stored to the portable storage device 110. The addition or removal of chunks 128 of user data can be the result of modifying or adding user data, or likewise can be the result of migrating user data without substantively changing it. It can be advantageous for data reliability sake to maintain a redundant copy of the information in the library partition 162, either in one of the partitions 162, 164 or in its own dedicated partition. For example, without limitation, the primary copy of the library information can be maintained at the existing state pending and during the time that a redundant copy is being written or migrated, so that in the event of a data transfer error or interruption the data storage system 100 can roll back to the previous state as defined by the primary copy of the library information to facilitate a quicker, more robust recovery from such an event.

The controller 116 compares each chunk identifier 134 generated by the CF module 118 with the chunk identifiers 134 that have been previously stored in the memory 122'. For the purposes of this illustrative description the chunk identifiers 134 are generally referred to as CF tags ("$CF_n$") 134, generally contemplating whatever particular identifier is employed such as hash tags or fingerprints and the like. The CF tags 134 can be stored in the memory 122' using one or more data structures such as a binary tree, an indexed list, and an indexed binary tree.

For purposes of this illustrative description, the controller 116 determines that none of the CF tags 134 corresponding to the current write command are stored in the memory 122'. In that case the controller 116 writes the CF tags 134 (labeled $CF_1$, $CF_2$, $CF_3$, $CF_4$, $CF_5$) to the memory 122' and stores the respective chunks 128 (labeled 1, 2, 3, 4, 5) to the user data partition 164 in the removable storage device $110_1$.

Figure 8:
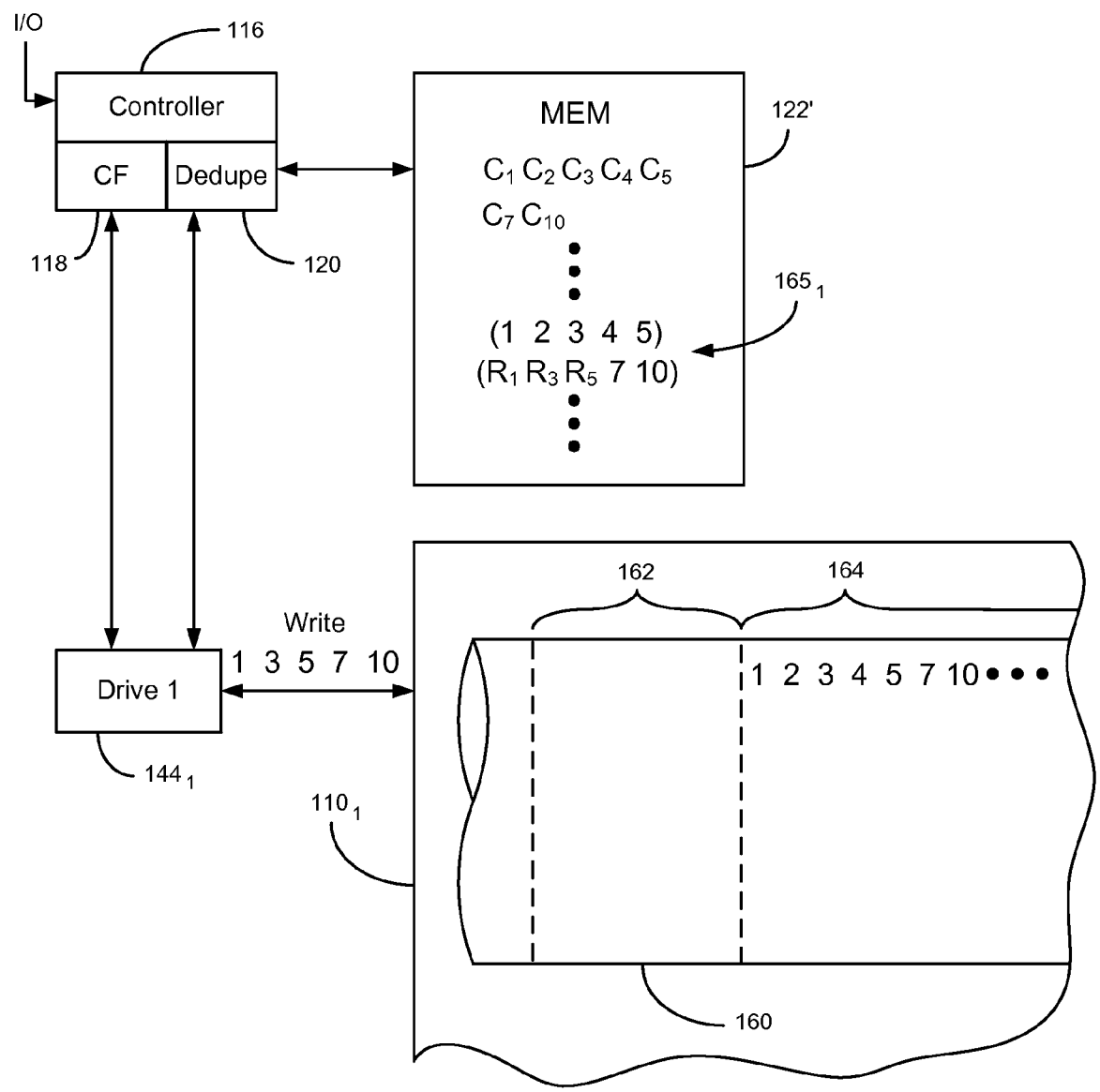
FIG. 8 is similar to FIG. 7 but for the controller directing a subsequent write request for chunks 1, 3, 5, 7, 10 to the tape cartridge.

FIG. 8 is similar to FIG. 7 but for showing the controller 116 now directing a subsequent write request for five chunks 128 identified by the CF module 118 as data patterns 1, 3, 5, 7, 10. The controller 116 ascertains that the data pattern 1 is already stored in the memory 122', so the controller 116 writes a reference to the already-existing data pattern 1 ("$R_1$") in the user data partition 164 of the portable data storage device $110_1$ instead of redundantly writing the data pattern 1 again. The reference $R_1$ is a data structure that points or links to the already existing chunk 128 of data pattern 1 such that the written data 1, 3, 5, 7, 10 can be reconstituted in relation to the already written data pattern 1 in the previously written data 1, 2, 3, 4, 5.

The same is true for the data pattern 3 and the data pattern 5, resulting in the controller 116 writing corresponding references $R_3$, $R_5$ instead of redundantly writing the data patterns. Because the controller 116 determines that neither data pattern 7 nor data pattern 10 is stored in the memory 122', the controller 116 writes the CF tags 134 (labeled $CF_7$, $CF_{10}$) to the memory 122' and writes the chunks 128 of data pattern 7 and data pattern 10 to the user data partition 164 of the removable storage device $110_1$.

Figure 9:
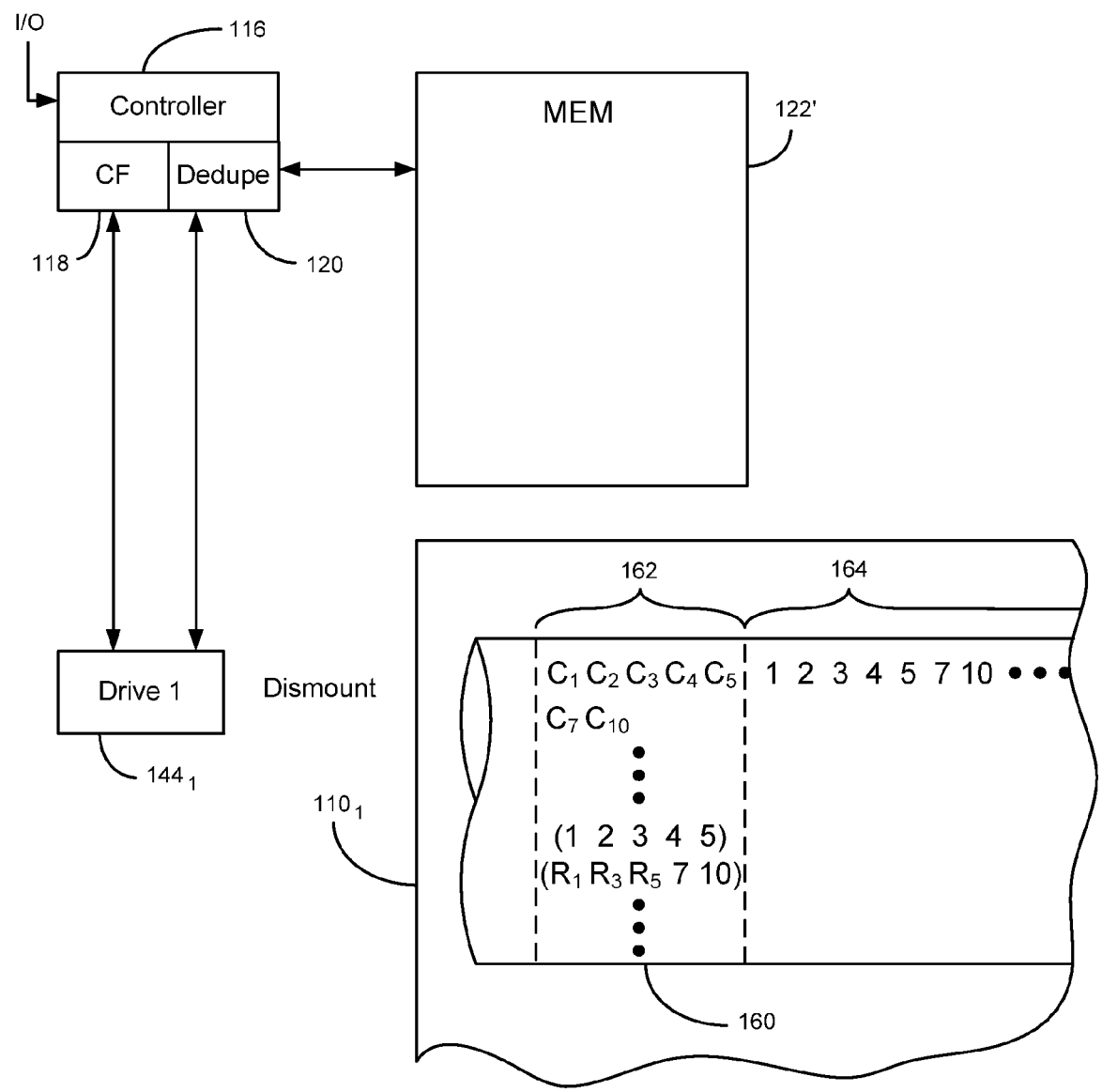
FIG. 9 is similar to FIG. 8 but for the controller migrating the CF tags from the memory to the library index of the tape cartridge before dismounting the tape cartridge from the first tape drive.

FIG. 9 continues the similarity but for the controller 116 now calling for dismounting the tape cartridge $110_1$ from the drive $144_1$ ("Drive 1"). Before the controller 116 permits the data transfer relationship to be lost between the drive $144_1$ and the tape cartridge $110_1$, the controller 116 migrates the contents of memory 122' to the library index 162 of the tape cartridge $110_1$.

Figure 10:
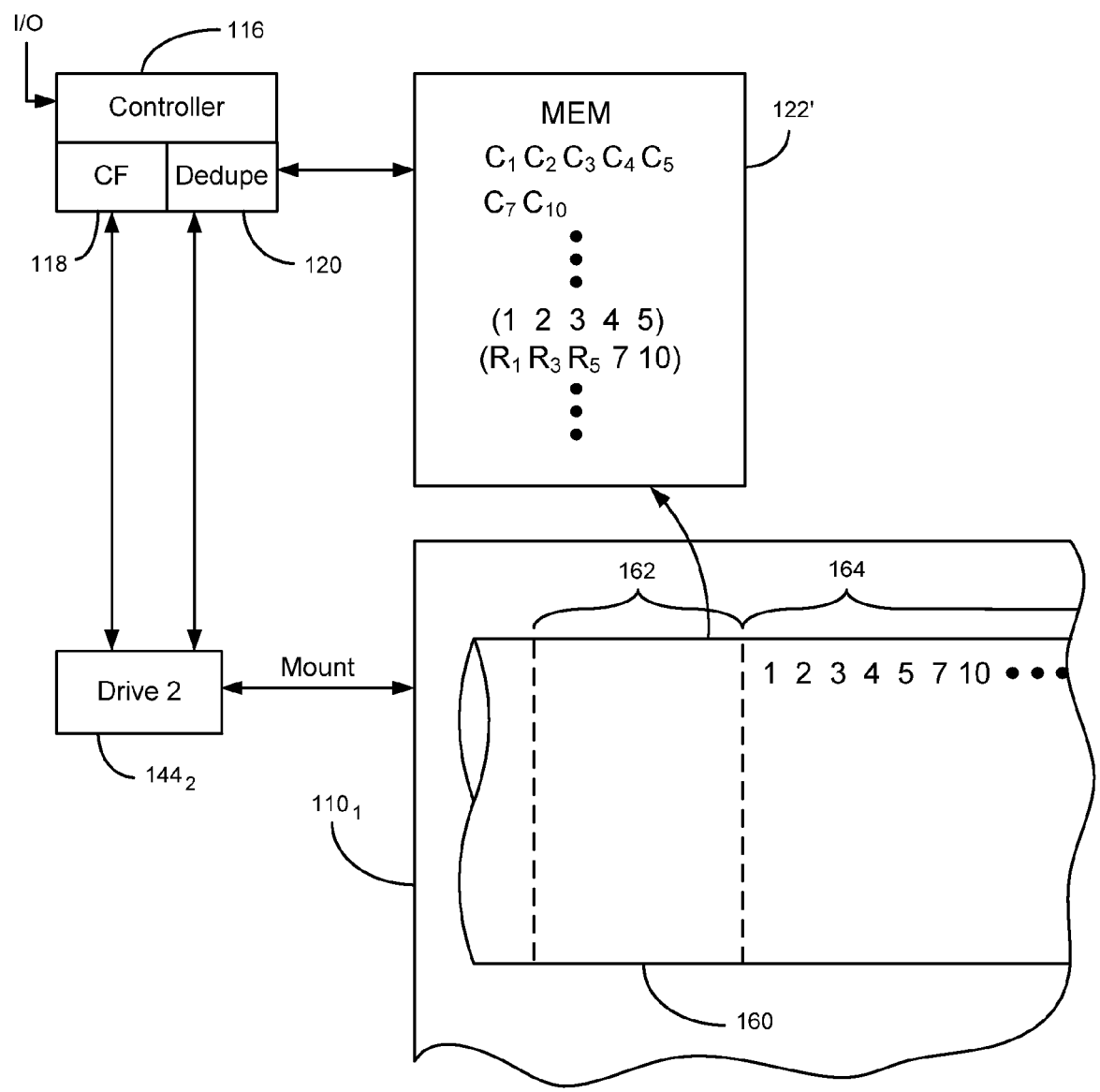
FIG. 10 is similar to FIG. 9 but for the controller mounting the tape cartridge to the second tape drive and migrating the CF tags from the library index of the tape cartridge to the memory before directing any data transfers with the tape cartridge.
Figure 11:
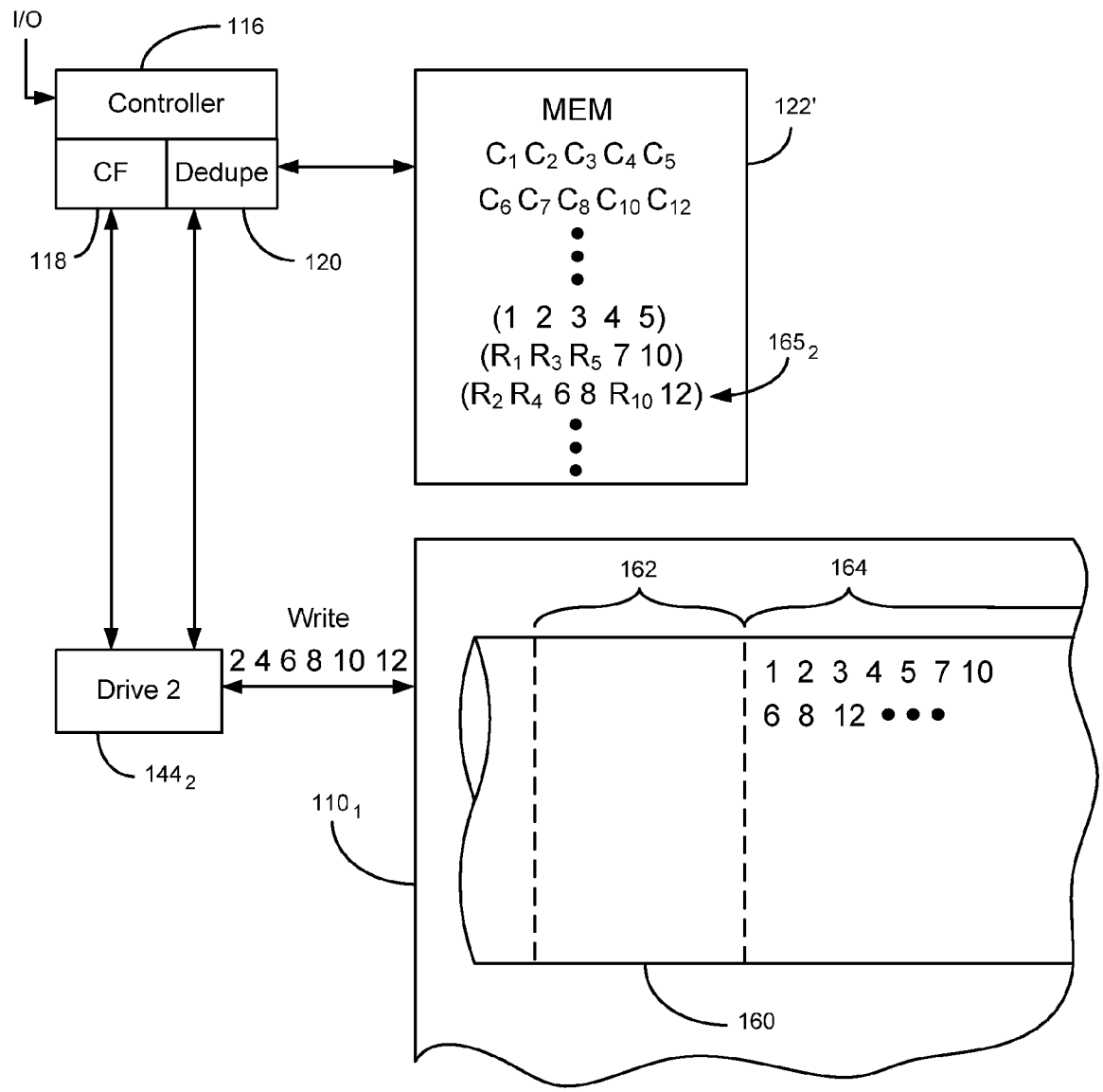
FIG. 11 is similar to FIG. 10 but for the controller subsequently directing a write request for chunks 2, 4, 6, 8, 10, 12 to the tape cartridge.

FIG. 10 diagrammatically depicts the controller 116 having directed the same tape cartridge $110_1$ in FIGS. 7-9 to now be mounted in a different tape drive $144_2$ ("Drive 2"). The controller 116 first migrates the contents of the library partition 162 to the memory 122' before permitting any user data transfers between the user data partition 164 and the tape drive $144_2$. Subsequently, FIG. 11 depicts the controller 116 directing a write request for six chunks 128 of data patterns 2, 4, 6, 8, 10, 12. As described above, the first two data patterns 2, 4 already exist in the memory 122' so the controller 116 writes in the user data partition 164 references $R_2$, $R_4$ to the already existing data patterns. The next two data patterns 6, 8 are not found in the memory 122' so the controller writes the CF tags 134 ($CF_6$, $CF_8$) to the memory 122' and writes the chunks 128 of data patterns 6, 8 to the user data partition 164 of the portable storage device $110_1$. Note that in these preferred embodiments the memory 122' is capable of sequentially ordering the CF tags 134, such as by memory shifting operations in a solid state memory, to place $CF_6$ between the already stored $CF_5$, $CF_7$ and to likewise place $CF_8$ between the already stored $CF_7$, $CF_{10}$.

Like data patterns 2, 4 the data pattern 10 already exists in the memory 122' so the controller 116 writes in the user data partition 164 a reference $R_{10}$ to the already existing data pattern. Like data patterns 6, 8 the data pattern 12 did not already exist in the memory 122' so the controller 116 writes the CF tag 134 (CF12) in the memory 122' and writes the chunk 128 of data pattern 12 in the user data partition 164.

Figure 12:
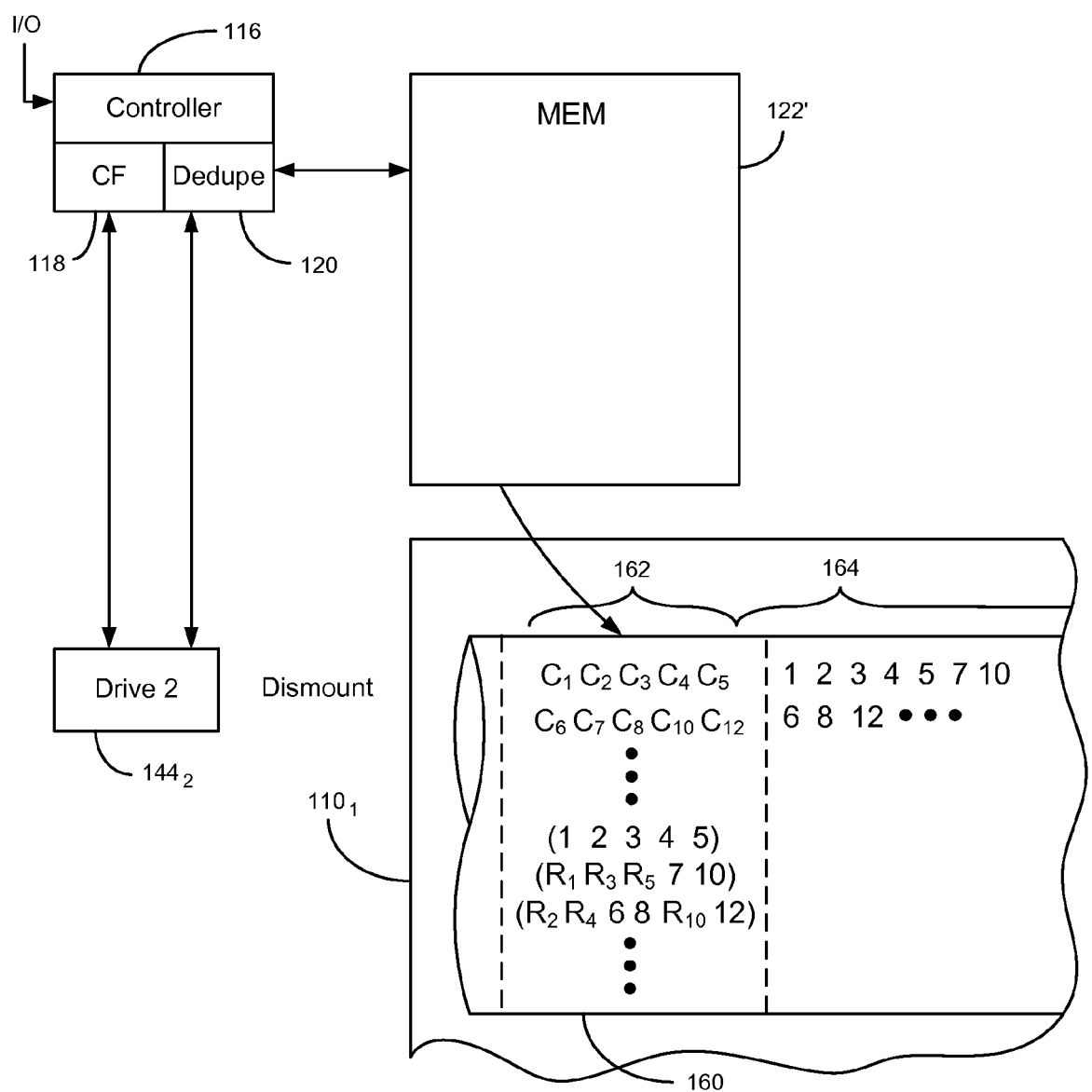
FIG. 12 is similar to FIG. 11 but for the controller migrating the contents of the memory to the library index of the tape cartridge before dismounting the tape cartridge from the second tape drive.
Figure 13:
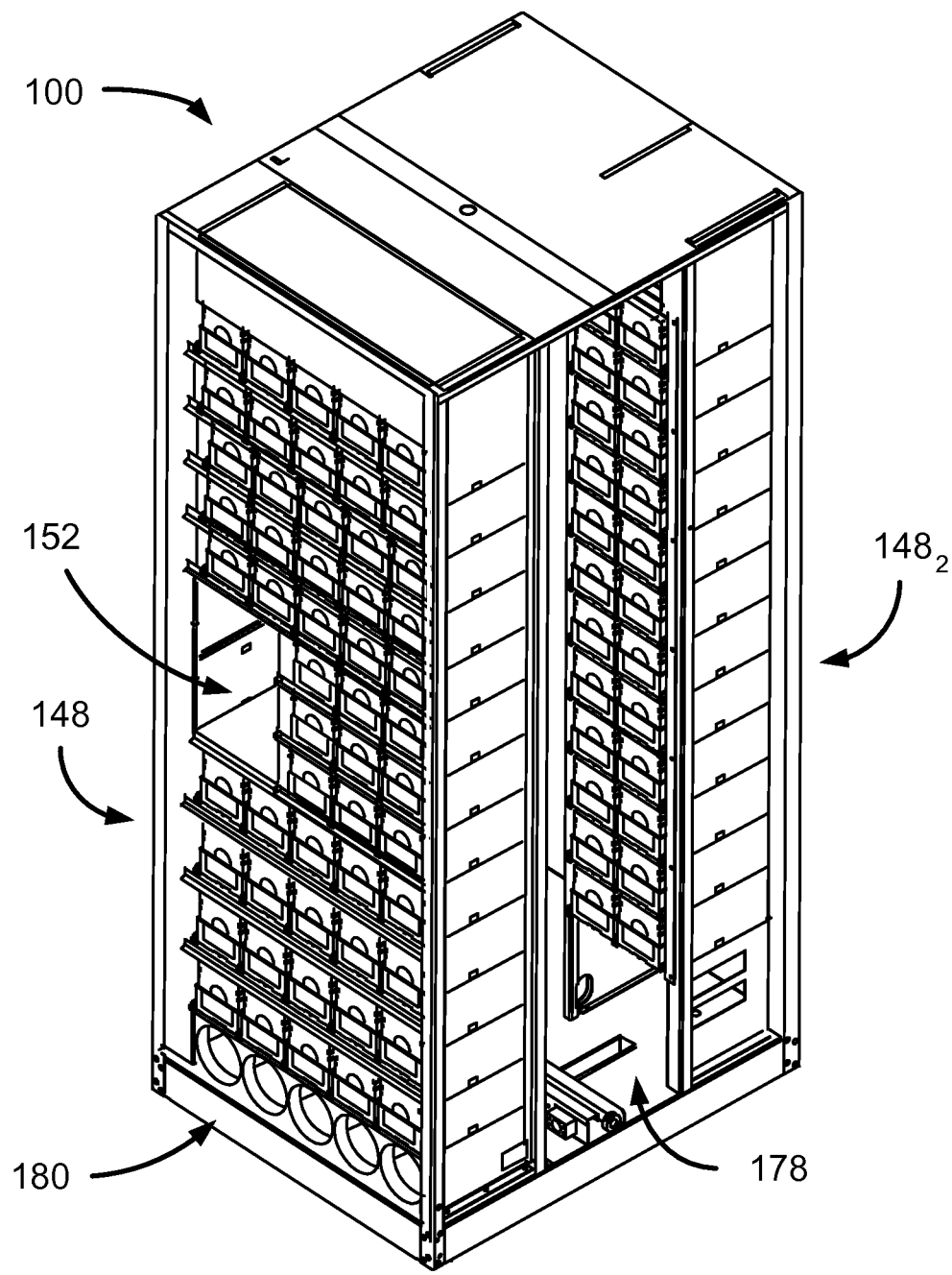
FIG. 13 is an isometric depiction of a portion of a tape library constructed in accordance with illustrative embodiments of the present invention.

FIG. 12 is similar to FIG. 9 in that the controller 116 first calls for migrating the contents of the memory 122' to the library index 162 before dismounting the tape cartridge $110_1$ from the tape drive $144_2$.

Embodiments of the present invention can be commercially practiced in a Spectra Logic T-950 tape cartridge library manufactured by Spectra Logic of Boulder Colo. FIG. 10 shows a commercial embodiment of one T-950 tape library without an enclosure. The T-950 tape library comprises a first and second shelf system $148_1$, $148_2$ that are adapted to support a plurality of the mobile media, such as the magazine 138 holding a plurality of LTO tape cartridges 136 with MAMs, archived by the tape library. The shelf systems $148_1$, $148_2$ can each have at least one auxiliary memory reader. Disposed next to the second shelf system $148_2$ are at least four IBM LTO tape drives 112 adapted to write data to and read data from a tape cartridge 136. The IBM LTO tape drives 112 each have the capability of storing data to an auxiliary radio frequency memory device contained in an LTO tape cartridge 136. Functionally interposed between the first and second shelf system $148_1$, $148_2$ is a magazine transport space 178. The magazine transport space 178 is adapted to provide adequate space for a magazine 138 to be moved, via the transport unit 150 (FIG. 3), from a position in the first shelf system 148₁, for example, to a tape drive 112. The transport unit 150 can further accommodate at least one auxiliary radio frequency memory device reader. Magazines 138 can be transferred into and out from the T-950 tape library via the entry/exit port 152. Transferring magazines 138 in and out of the T-950 tape library can be accomplished by an operator, for example. The T-950 tape library comprises a means for cooling as shown by the fans 180, located at the base of the tape library. The T-950 tape library can be linked to a central data base, providing control in storage of all of the auxiliary radio frequency memory devices contained in each tape cartridge 136 in the T-950 tape library as read by any one of the auxiliary radio frequency memory device readers. The T-950 tape library also includes the library CPU 146 (FIG. 3) providing top-level control and coordination of all processes. The T-950 tape library also provides the graphical user interface 147 (FIG. 3) whereon a display of assessment results or, in alternative embodiments, simple messages can be displayed pertaining to a user-specified action associated with a tape cartridge 136 such as an alert accompanying a sound alarm or recommendations for further action/s, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple write commands can be simultaneously interleaved by the data pathway logic in performing the I/O throughput for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the tape library, communication can be received directly by a tape drive, via the interface device 120 for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A data storage system comprising:
   a tape cartridge adapted to operably transfer data between the data storage system and an external computing device via execution of a plurality of input/output (I/O) commands;
   a commonality factoring (CF) module adapted to execute computer instructions retained in control memory to assign a CF tag to a data pattern in the transferred data; and
   a deduplication module adapted to execute computer instructions retained in the control memory or a different memory device, the computer instructions are arranged to determine if the data pattern corresponding to the CF tag was previously stored in the tape cartridge,
   the tape cartridge being physically partitioned into an addressable library partition and a differently addressable user data partition;
   a drive that interfaces the I/O commands with the external computing device, wherein the tape cartridge is removably mounted in the drive;
   a plurality of different CF tags stored in the library partition corresponding to different data patterns stored in the user data partition.

2. The data storage system of claim 1 wherein the computer instructions are adapted to store the CF tag in the library partition and store the data pattern in the user data partition if the CF tag was not previously stored in the library partition.

3. The data storage system of claim 2 wherein the computer instructions are adapted to store in the user data partition a reference to the data pattern if the CF tag was previously stored in the library partition.

4. The data storage system of claim 1 wherein the plurality of CF tags in the library partition is stored in a data structure that is indexable by the CF tag.

5. The data storage system of claim 1 comprising an independent memory device to which the data storage system operably transfers the plurality of CF tags from the library partition.

6. The data storage system of claim 5 wherein the computer instructions are adapted to store in the control memory the CF tag and store in the removable storage device the data pattern if the CF tag was not previously stored in the control memory.

7. The data storage system of claim 6 wherein the computer instructions are adapted to store in the removable storage device a reference to the data pattern if the CF tag was previously stored in the memory.

8. The data storage system of claim 7 wherein the computer instructions are adapted to transfer the plurality of CF tags from the control memory to the library partition of the removable storage device before the removable storage device is operably removed from the drive.

9. A method comprising:
   obtaining a data storage system having a removable storage device that is partitioned into an addressable library partition and a differently addressable user data partition;
   transferring data between the data storage system and an external computing device via execution of a plurality of input/output (I/O) commands;
   performing commonality factoring (CF) to assign a CF tag to a data pattern in the transferred data;

deduplicating data by determining whether the data pattern corresponding to the CF tag was previously stored in the removable storage device;

storing the CF tag in the library partition and storing the data pattern in the user data partition if it is determined that the CF tag is not previously stored in the library partition; and storing a reference to the data pattern in the user data partition if it is determined that the CF tag is previously stored in the library partition.

10. The method of claim 9 wherein the obtaining is characterized by the data storage system having a memory to which a plurality of the CF tags are transferred from the library partition, and wherein the deduplicating stores in the memory the CF tag and stores in the removable storage device the data pattern if it is determined that the CF tag is not previously stored in the memory.

11. The method of claim 10 wherein the deduplicating stores in the removable storage device a reference to the data pattern if it is determined that the CF tag is previously stored in the memory.

12. The method of claim 11 wherein the deduplicating transfers the plurality of CF tags from the memory to the library partition.

13. The method of claim 12 wherein the obtaining is characterized by a drive to which the removable storage device is removably mounted for the transferring data, and wherein the deduplicating transfers the plurality of CF tags from the memory to the library partition before the removable storage device is operably removed from the drive.

14. A data storage library comprising:
a frame;
a shelf system supported by the frame to queue a plurality of tape cartridges;
a plurality of tape drives each adapted to engage one of the tape cartridges at a time in a data transfer relationship wherein data is transferred;
a transport system adapted to selectively move the tape cartridges between the queue in the shelf and one of the plurality of tape drives;
a control memory; and
a controller adapted to selectively access instructions retained in the control memory that when executed is adapted to assign a commonality factoring (CF) tag to a data pattern in the transferred data and deduplicate stored data by determining if the CF tag was previously stored in one of the tape cartridges, the tape cartridge being physically partitioned into an addressable library partition that contains the CF tag and a differently addressable user data partition
a plurality of different CF tags stored in the library partition corresponding to different data patterns stored in the user data partition.

* * * * *